(12) United States Patent
Panje

(10) Patent No.: US 11,563,792 B2
(45) Date of Patent: Jan. 24, 2023

(54) MANAGING REPOSITIONING REQUESTS IN HLS AND DASH

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/493,505

(22) Filed: Oct. 4, 2021

(65) Prior Publication Data

US 2022/0109716 A1 Apr. 7, 2022

Related U.S. Application Data

(60) Provisional application No. 63/087,466, filed on Oct. 5, 2020.

(51) Int. Cl.
*H04L 29/06* (2006.01)
*H04L 65/75* (2022.01)
*H04L 65/65* (2022.01)

(52) U.S. Cl.
CPC ............ *H04L 65/765* (2022.05); *H04L 65/65* (2022.05)

(58) Field of Classification Search
CPC ............................ H04L 65/605; H04L 65/608
See application file for complete search history.

(56) References Cited

U.S. PATENT DOCUMENTS

| | | | | |
|---|---|---|---|---|
| 8,483,551 B2 * | 7/2013 | Jeong | ..................... | H04N 5/783 386/345 |
| 8,909,922 B2 * | 12/2014 | Kiefer | ................... | H04L 9/0822 713/160 |
| 9,813,740 B2 * | 11/2017 | Panje | ............... | H04N 21/44209 |
| 11,218,663 B2 * | 1/2022 | Liu | ...................... | H04N 19/115 |
| 2014/0003516 A1 * | 1/2014 | Soroushian | ........ | H04N 21/2387 375/240.13 |

* cited by examiner

*Primary Examiner* — Esther B. Henderson
*Assistant Examiner* — Nazia Naoreen
(74) *Attorney, Agent, or Firm* — Chernoff, Vilhauer, McClung & Stenzel, LLP

(57) ABSTRACT

Methods and systems of managing a repositioning request for a HTTP Live Streaming (HLS) or Dynamic Adaptive Streaming over HTTP (DASH) media stream are shown and disclosed. In one embodiment, the method includes receiving a repositioning request for a particular position in the HLS or DASH media stream. The particular position does not have an Instantaneous Decoder Refresh (IDR) frame. The method additionally includes transcoding a new segment of the HLS or DASH media stream such that an IDR frame coincides with the particular position. The method further includes delivering the transcoded segment in response to the repositioning request.

13 Claims, 3 Drawing Sheets

MANAGING REPOSITIONING REQUESTS IN HLS AND DASH

CROSS REFERENCE TO RELATED APPLICATIONS

The present disclosure claims priority to U.S. Provisional App. No. 63/087,466, entitled "MANAGING REPOSITIONING REQUESTS IN HLS AND DASH", filed Oct. 5, 2020, the contents of which is incorporated herein by reference in its entirety.

BACKGROUND

The subject matter of this application relates to HLS and DASH media streams, in particular systems and methods of handling repositioning requests, such as trick play requests, in HLS and DASH media streams.

HTTP Live Streaming (HLS) and Dynamic Adaptive Streaming over HTTP (DASH) currently form a majority of adaptive streaming and are thus widespread in the industry. In HLS and DASH, the server maintains different playlists with different bit rates (quality). The content is split into several file chunks that are specified within each playlist. The client downloads the playlist files, determines available network bandwidth, selects the appropriate playlist based on the available network bandwidth, selects files from the selected playlist, and plays each file chunk sequentially. The client periodically monitors the available network bandwidth, downloads and/or updates playlists, and plays accordingly.

To do trick plays (e.g., forward, rewind, etc.), the client running the player can do a repositioning by requesting a HTTP byte range request. Once receiving the chunk, the player computes the nearest Instantaneous Decoder Refresh (IDR) frame preceding to the requested position, decodes, and then presents from the user requested position. However, the above process is time consuming and can lead to delays in presenting the user requested position. What is desired, therefore, are systems and/or methods of managing repositioning requests, such as trick plays, to reduce presentation delays.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
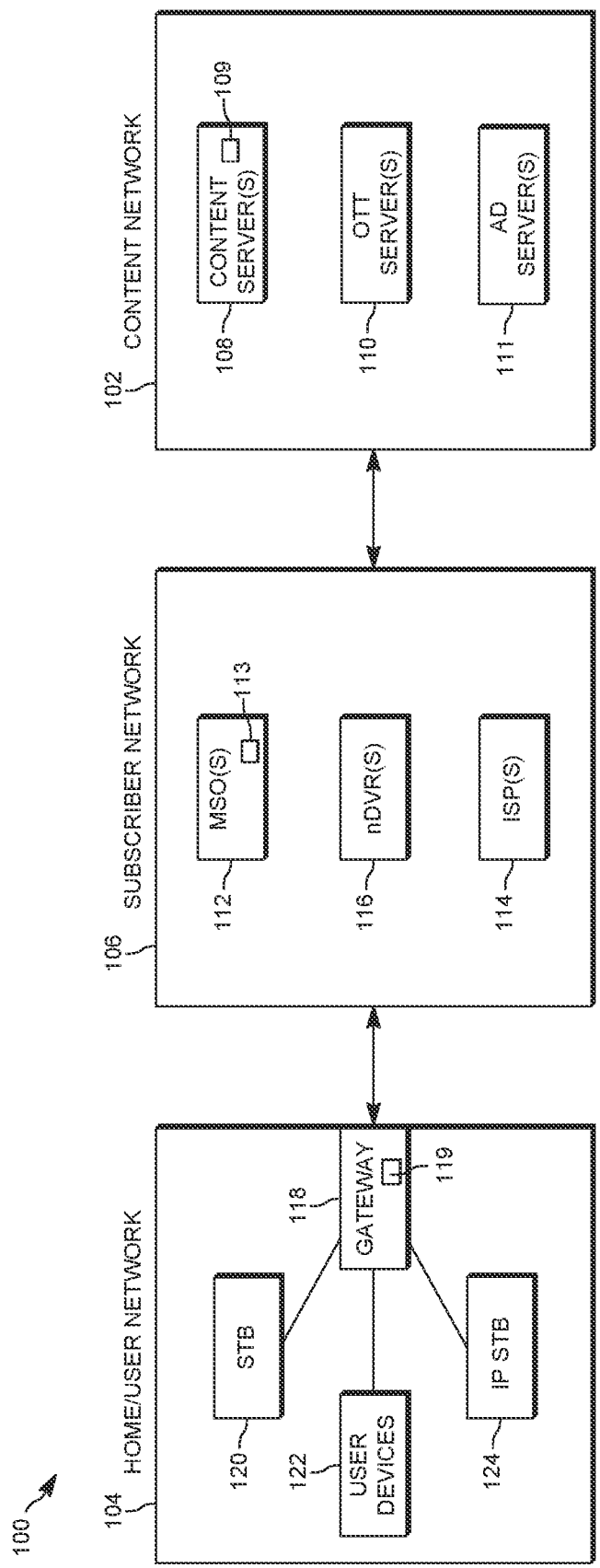
FIG. 1 is a high-level block diagram of an example of a network managing repositioning requests in HLS and DASH media streams.

Referring to FIG. 1, an example network environment 100 for providing content from a content network 102 to a home or user network 104 via a provider, access, or subscriber network 106, and for managing content viewed by customers in the home or user network. Content includes any type of video or audio media, such as movies, television shows, music, radio, advertisements, etc.

Content network 102 includes one or more content servers 108, one or more over-the-top servers 110, and one or more advertisement servers 111. The content, over-the-top, and advertisement servers store content that is provided to home network 104. Content server(s) 108 provide content via a multiple system operator (MSO) and/or an internet service provider. In some embodiments, content server(s) 108 includes a repositioning request management component or apparatus 109, which includes software, hardware, and/or firmware capable of receiving repositioning requests and transcoding segments (e.g., transcoding segment(s) such that IDR frame(s) coincide or correspond to the repositioning request(s)). Over-the-top servers (OTT) 110 provide content only via over the top streaming for at least one client device of the home network. Advertising server(s) 111 provide advertising content, such as targeted advertising content.

Subscriber network 106 includes one or more Multiple System Operator (MSO) systems 112, which includes multiple cable TV systems and/or direct satellite TV systems. For example, MSO system 112 may include one or more headends, regional headends, a network architecture of fiber optic, twisted pair, and/or co-axial lines, and/or amplifiers. In some embodiments, MSO system 112 includes a repositioning request management component or apparatus 113, which includes software, hardware, and/or firmware capable of receiving repositioning requests and transcoding segments (e.g., transcoding segment(s) such that IDR frame(s) coincide or correspond to the repositioning request(s)). For example, the repositioning request management component may be part of and/or incorporated with one or more edge devices, one or more media caching devices, one or more transcoders, and/or other component(s) of MSO system 112.

Subscriber network 112 also includes one or more Internet Service Providers (ISP) 114. Each ISP 114 includes a Point of Presence (POP) that connect to Network Access Points (NAP), such as via routers and a T3 backbone. In the example shown in FIG. 1, subscriber network 106 includes one or more network Digital Video Recorders (nDVRs) 116, which may be part of and/or separate from MSO systems 112. Various content from content network 102 may be recorded and/or stored on nDVRs 116 based on requests made by users or subscribers. Subscriber network 106 may include other components not explicitly shown in FIG. 1, such as transcoders, streamers, just-in-time (JIT) packagers, etc.

Home/user network 104 includes a gateway 118, a set top box 120, user devices 122, and an Internet Protocol (IP) set top box 124. In some embodiments, gateway 118 includes a repositioning request management component or apparatus 119, which includes software, hardware, and/or firmware capable of receiving repositioning requests and transcoding segments (e.g., transcoding segment(s) such that IDR frame (s) coincide or correspond to the repositioning request(s)). Set top box 120 is operable to connect to a television to deliver television services through traditional terrestrial, satellite, and cable formats. Set top box 120 may include a digital video recorder (DVR) (not shown) and/or may have a graphic user interface (GUI) that may be assessed by the user via the television to which set top box 120 is connected. In other embodiments, the DVR may be separate from set top box 120

User devices 122 may be any device that may receive content, such as smart phones, mobile phones, tablet computers, smart watches and other wearables, gaming systems, etc. The user devices may have a GUI that may be accessed by the user via the screen on the device. IP set top box 124 is operable to connect to a television over the Internet instead of being delivered through traditional terrestrial, satellite, and cable formats. The IP set top box may include a digital video recorder (DVR) (not shown) and/or may have a GUI that may be accessed by the user via the television to which the IP set top box is connected. In other embodiments, the DVR may be separate from IP set top box 124.

Figure 2:
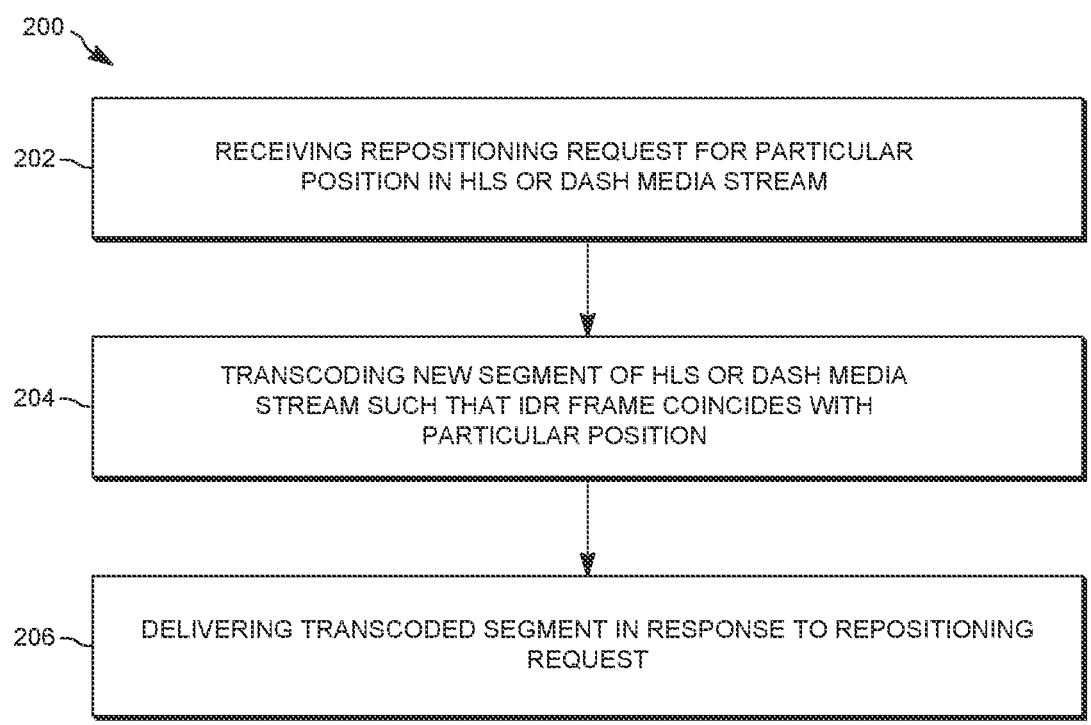
FIG. 2 is a flowchart illustrating an example of a process of managing repositioning requests in a HLS or DASH media stream.

Referring to FIG. 2, a flowchart is shown of an example method or process 200 of managing a repositioning request for a HLS or DASH media stream, which may be performed, for example, by MSO system 112, gateway 118, and/or one or more their components, such as repositioning request management component or apparatus 113 and/or 119. At 202, a repositioning request for a particular position in the HLS or DASH media stream is received. The particular position may not have an Instantaneous Decoder Refresh (IDR) frame associated with that position. The repositioning request may include a relative time of the particular position in an existing segment of the HLS or DASH media stream, or may include an absolute presentation time stamp of the HLS or DASH media stream. The repositioning request may be for playback from a particular position at a normal rate, a fast forward rate (e.g., two, four, or six times the normal rate), or a fast reverse rate (e.g., two, four, or six time the normal rate). When the repositioning request is for playback at a fast forward or fast reversed rate, the repositioning request also may be referred to as a "trick play" request and the playback rate may be referred to as a "trick rate." In some embodiments, the repositioning request may include a request for a particular bit rate of the HLS or DASH media stream.

At 204, a new chunk or segment of the HLS or DASH media stream is transcoded such that an IDR frame coincides or corresponds with the particular position. When the repositioning request includes a relative time of the particular position, the transcoding may be performed such that the IDR frame coincides or corresponds with the requested relative time. When the repositioning request includes an absolute presentation time stamp, the transcoding may be performed such that the IDR frame coincides or corresponds with the absolute presentation time stamp of the HLS or DASH media stream. When a particular bit rate is included with the repositioning request, the transcoding may be performed at the requested bit rate.

At 206, the transcoded segment is delivered in response to the repositioning request. Although FIG. 2 shows particular steps for a process of managing a repositioning request for a HLS or DASH media stream, other examples of the process may add, omit, replace, repeat, and/or modify one or more steps. For example, if the server is loaded or too busy, the requested chunk or segment may be provided without the transcoding or for transcoding instead at the MSO system, gateway, and/or user device.

An example HLS playlist is shown in Table 1 below.

TABLE 1

EXTM3U
EXT-X-TARGET DURATION: 10
EXT-X-VERSION: 3
EXTINF: 9.009, http://media/example.com/first.ts
EXTINF: 9.009. http://media/example.com/second.ts
EXTINF: 3.003, http://media/example.com/third.ts
EXT-X-ENDLIST An example of a repositioning request that includes a relative time of the seeked position under method 200 is: GET http://media.example.com/first.ts?TS=3.53 HTTP 1.1. In response to the request, transcoding is performed on the first transport stream such that an IDR frame coincides with the 3.53 second position in the first transport stream. In contrast, an example of a repositioning request that requests a known Uniform Resource Identifier (URI) with an absolute presentation time stamp under method 200 is: GET http://media.example.com/Con_pos.ts?PTS=1234567 HTTP 1.1. In response to the request, transcoding is performed such that an IDR frame coincides with the 1234567 absolute time stamp of the media stream from media.example.com.

Figure 3:
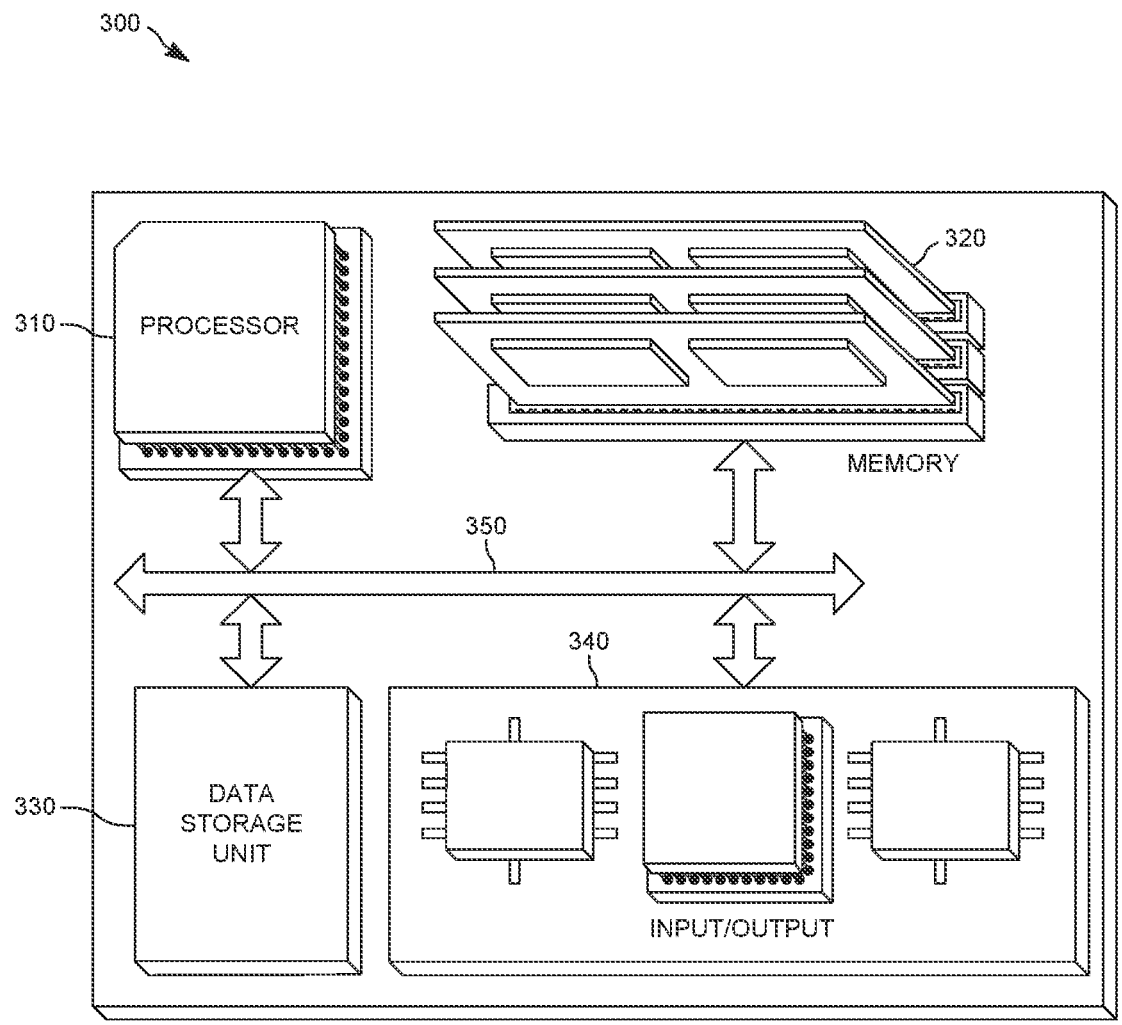
FIG. 3 is a block diagram of an example of a hardware configuration operable to manage advertising content.

Referring to FIG. 3, a hardware configuration 300 operable to facilitate managing a repositioning request for a HLS or DASH media stream is shown. The hardware configuration may be configured to implement or execute one or more of the processes performed by any of the various components, engines, modules, and devices described in the present disclosure, including MSO system 112, gateway 118, and/or repositioning request management component or apparatus 113 and/or 119. The hardware configuration 300 may include a processor 310, memory 320, a storage device 330, and an input/output device 340. Each of the components 310, 320, 330, and 340 may, for example, be interconnected using a system bus 350. The processor 310 may be capable of processing instructions for execution within the hardware configuration 300. In one implementation, the processor 310 may be a single-threaded processor. In another implementation, the processor 310 may be a multi-threaded processor. The processor 310 may be capable of processing instructions stored in the memory 320 or on the storage device 330.

The memory 320 may store information within the hardware configuration 300. In one implementation, the memory 320 may be a computer-readable medium. In one implementation, the memory 320 may be a volatile memory unit. In another implementation, the memory 320 may be a non-volatile memory unit. In some implementations, the storage device 330 may be capable of providing mass storage for the hardware configuration 300. In one implementation, the storage device 330 may be a computer-readable medium. In various different implementations, the storage device 330 may, for example, include a hard disk device, an optical disk device, flash memory or some other large capacity storage device. In other implementations, the storage device 330 may be a device external to the hardware configuration 300.

The input/output device 340 provides input/output operations for the hardware configuration 300. In embodiments, the input/output device 340 may include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device, IP device, mobile device, or other device. In embodiments, the input/output device may include driver devices configured to send communications to, and receive communications from an advertisement decision system, an advertisement media source, and/or a CDN.

The methods, systems, and apparatuses described in this disclosure enable the identification and retrieval of one or more preferred or requested media renditions of multimedia content. A subscriber device may maintain a list of media attributes preferred by the subscriber device and/or one or more users with access to the subscriber device, wherein the list includes preferred media attributes in order from the most requested/received attribute to the least requested/ received attribute. When the subscriber device receives a request for multimedia content, the subscriber device may identify one or more media attributes preferred by the subscriber, and media renditions of the multimedia content in each of the identified attributes may be downloaded to the subscriber device.

The subject matter of this disclosure, and components thereof, may be realized by instructions that upon execution cause one or more processing devices to carry out the processes and functions described above. Such instructions may, for example, comprise interpreted instructions, such as script instructions, e.g., JavaScript or ECMAScript instructions, or executable code, or other instructions stored in a computer readable medium.

Implementations of the subject matter and the functional operations described in this specification may be provided in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a tangible program carrier for execution by, or to control the operation of, data processing apparatus.

A computer program (also known as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows may also be performed by, and apparatus may also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory may be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the claims below. For example, the actions recited in the claims may be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method for managing a repositioning request for a HTTP Live Streaming (HLS) or Dynamic Adaptive Streaming over HTTP (DASH) media stream, comprising:
   receiving a repositioning request for a particular position in the HLS or DASH media stream, wherein the particular position does not have an Instantaneous Decoder Refresh (IDR) frame;
   transcoding a new segment of the HLS or DASH media stream such that an IDR frame coincides with the particular position; and
   delivering the transcoded segment in response to the repositioning request.

2. The method of claim 1, wherein receiving a repositioning request for a particular position in the HLS or DASH media stream includes receiving the repositioning request with a relative time of the particular position in an existing segment of the HLS or DASH media stream.

3. The method of claim 2, wherein transcoding the new segment such that an IDR frame coincides with the particular position includes transcoding the existing segment such that the IDR frame coincides with the requested relative time.

4. The method of claim 1, wherein receiving a repositioning request for a particular position in the HLS or DASH media stream includes receiving the repositioning request with an absolute presentation time stamp of the HLS or DASH media stream.

5. The method of claim 4, wherein transcoding the new segment such that an IDR frame coincides with the particular position in the HLS or DASH media stream includes transcoding the new segment such that the IDR frame coincides with the absolute presentation time stamp of the HLS or DASH media stream.

6. The method of claim 1, wherein receiving a repositioning request for a particular position in the HLS or DASH media stream includes receiving a requested bit rate of the HLS or DASH media stream, and wherein transcoding a new segment such that an IDR frame coincides with the particular position includes transcoding the new segment at the requested bit rate.

7. The method of claim 1, wherein receiving a repositioning request for a particular position in the HLS or DASH media stream includes receiving the repositioning request for playback at a normal rate from the particular position.

8. The method of claim 1, wherein receiving a repositioning request for a particular position in the HLS or DASH media stream includes receiving the repositioning request for playback at a fast forward rate from the particular position.

9. The method of claim 8, wherein receiving the repositioning request for playback at a fast forward rate from the particular position includes receiving the repositioning request for playback at a fast forward rate that is twice the normal rate from the particular position.

10. The method of claim 8, wherein receiving the repositioning request for playback at a fast forward rate from the particular position includes receiving the repositioning request for playback at a fast forward rate that is four times the normal rate from the particular position.

11. The method of claim 1, wherein receiving a repositioning request for a particular position in the HLS or DASH media stream includes receiving the repositioning request for playback at a fast reverse rate from the particular position.

12. The method of claim 11, wherein receiving the repositioning request for playback at a fast reverse rate from the particular position includes receiving the repositioning request for playback at a fast reverse rate that is twice the normal rate from the particular position.

13. The method of claim 11, wherein receiving the repositioning request for playback at a fast reverse rate from the particular position includes receiving the repositioning request for playback at a fast reverse rate that is four times the normal rate from the particular position.

* * * * *